US011356572B2

(12) United States Patent
Sakaida

(10) Patent No.: US 11,356,572 B2
(45) Date of Patent: Jun. 7, 2022

(54) INFORMATION PROCESSING DEVICE AND INFORMATION PROCESSING SYSTEM

(71) Applicant: FUJIFILM BUSINESS INNOVATION CORP., Tokyo (JP)

(72) Inventor: Hiroshi Sakaida, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 197 days.

(21) Appl. No.: 16/566,232

(22) Filed: Sep. 10, 2019

(65) Prior Publication Data
US 2020/0099807 A1  Mar. 26, 2020

(30) Foreign Application Priority Data

Sep. 20, 2018  (JP) .............................. JP2018-176370

(51) Int. Cl.
*H04N 1/00* (2006.01)
*H04N 1/44* (2006.01)

(52) U.S. Cl.
CPC ..... *H04N 1/00474* (2013.01); *H04N 1/00344* (2013.01); *H04N 1/00503* (2013.01); *H04N 1/00514* (2013.01); *H04N 1/4433* (2013.01); *H04N 2201/0094* (2013.01)

(58) Field of Classification Search
CPC ........... H04N 1/00474; H04N 1/00938; H04N 2201/0094

USPC ........................................................ 358/1.13
See application file for complete search history.

(56) References Cited

U.S. PATENT DOCUMENTS 10,033,890 B2 * 7/2018 Hanada .............. H04N 1/00474
2009/0009795 A1 * 1/2009 Kong .................... G06F 3/1215
                                                                358/1.15
2012/0033257 A1 * 2/2012 Okazawa ........... H04N 1/00503
                                                                358/1.15

FOREIGN PATENT DOCUMENTS

JP       2007-318542 A      12/2007
JP       2008-234118 A      10/2008

OTHER PUBLICATIONS

Mori et al.; Controller and It's Control Method; Publication Date Dec. 6, 2007; Canon Inc.; Cited portions of English Translation.*

* cited by examiner

*Primary Examiner* — Neil R McLean
(74) *Attorney, Agent, or Firm* — Oliff PLC

(57) ABSTRACT

An information processing device includes a control unit that causes a display unit provided in each of a first device and a second device to display cooperative operation information for operating a cooperative function achievable by linking the first device and the second device.

6 Claims, 7 Drawing Sheets

| USER | DEVICE | CAPABILITY |
|---|---|---|
| α | PRINTER A | PRINT FUNCTION, NUMBER OF TRAYS ··· |
|  | PC (B) | IMAGING FUNCTION (SCAN FUNCTION) ··· |
|  | ··· | ··· |
| β | ··· | ··· |
| ··· | ··· | ··· |

| COMBINATION OF DEVICES (FUNCTIONS) | COOPERATIVE FUNCTION |
|---|---|
| ·PRINTER A<br>·PC (B) | COPY FUNCTION, ··· |
| ··· | ··· |

INFORMATION PROCESSING DEVICE AND INFORMATION PROCESSING SYSTEM

CROSS-REFERENCE TO RELATED APPLICATIONS

This application is based on and claims priority under 35 USC 119 from Japanese Patent Application No. 2018-176370 filed Sep. 20, 2018.

BACKGROUND

(i) Technical Field

The present disclosure relates to an information processing device and an information processing system.

(ii) Related Art

Japanese Unexamined Patent Application Publication No. 2007-318542 describes a device that, when it is detected that multiple devices function as a multi-purpose peripheral, generates operation screen information for the multi-purpose peripheral using layout information on the multi-purpose peripheral, and operation screen information on the multiple devices.

Japanese Unexamined Patent Application Publication No. 2008-234118 describes a device that uses user interface generation information for multiple devices, thereby generating corresponding user interfaces for the devices in one tool which provides the user interfaces.

SUMMARY

When a cooperative function achievable by linking multiple devices is set, information (for instance, user interface information) for operating the cooperative function may be displayed on a display device other than the devices used for the cooperative function. In this case, the display device is separately needed.

Aspects of non-limiting embodiments of the present disclosure relate to eliminate the need of a display device for displaying information for operating a cooperative function, the display device being other than the devices utilized for the cooperative function.

Aspects of certain non-limiting embodiments of the present disclosure address the above advantages and/or other advantages not described above. However, aspects f the non-limiting embodiments are not required to address the advantages described above, and aspects of the non-limiting embodiments of the present disclosure may not address advantages described above.

According to an aspect of the present disclosure, there is provided an information processing device including a control unit that causes a display unit provided in each of a first device and a second device to display cooperative operation information for operating a cooperative function achievable by linking the first device and the second device.

BRIEF DESCRIPTION OF THE DRAWINGS

Exemplary embodiment of the present disclosure will be described in detail based on the following figures, wherein.

DETAILED DESCRIPTION

Figure 1:
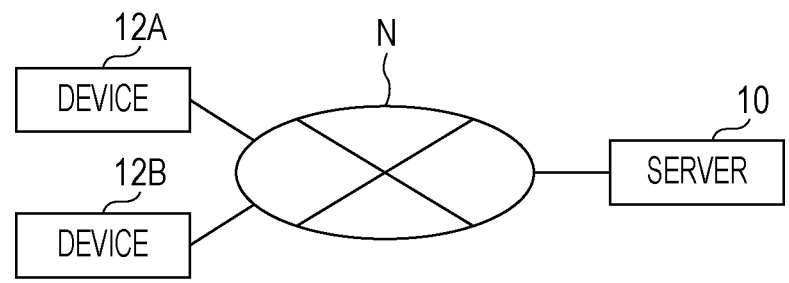
FIG. 1 is a block diagram illustrating the configuration of an information processing system according to an exemplary embodiment of the present disclosure.

An information processing system according to an exemplary embodiment of the present disclosure will be described with reference to FIG. 1. FIG. 1 illustrates an example of the information processing system according to the exemplary embodiment.

The information processing system according to the exemplary embodiment includes a server 10 and one or more devices. In the example illustrated in FIG. 1, the information processing system includes two devices (for instance, devices 12A and 12B). Hereinafter, when the devices 12A and 12B do not need to be distinguished, the devices 12A, 12B are referred to as the "device 12". The number of devices 12 illustrated in FIG. 1 is only an example, and the information processing system may include three or more devices 12. The server 10 and the device 12 have a function of communicating with other devices via, for instance, a communication line N such as the Internet or another network. The communication may be wireless communication or wired communication.

The server 10 is a device that manages association of the device 12 with users who operate the device 12, generates information to be displayed on the device and provides the information the device 12.

The device 12 is a device that has a function. The type of the device 12 is not particularly limited. The category of the concept of the device 12 includes devices in general, and may include, for instance, information devices, video devices, audio devices, and other devices. As a specific example, the device 12 is, for instance, an image forming device raving an image forming function (such as a scan function, a print function, and a copy function), a personal computer (PC), a tablet C, a smartphone, a mobile phone, a robot, a projector, and a display device. These are only examples, and so-called home appliances may be used as the device 12.

Figure 2:
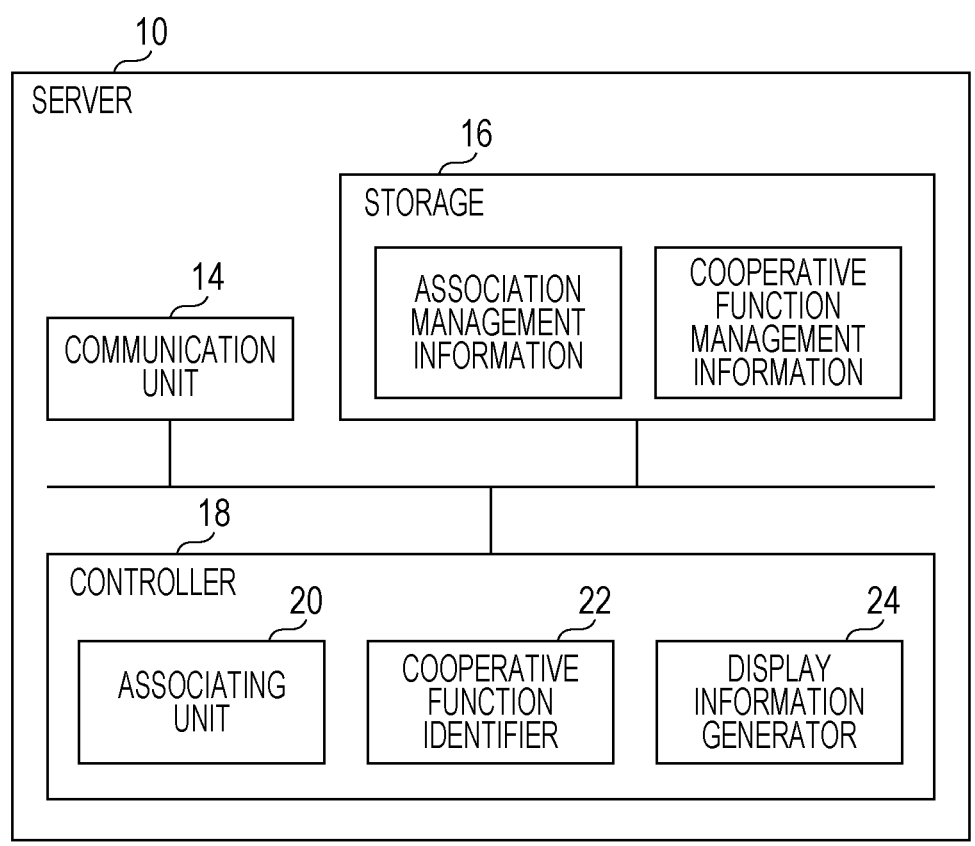
FIG. 2 is a block diagram illustrating the configuration of a server.

Hereinafter, the configuration of the server 10 will be described in detail with reference to FIG. 2. FIG. 2 illustrates an example of the configuration of the server 10.

The communication unit 14 is a communication interface, and is configured to transmit information to other devices, and to receive information from other devices. The communication unit 14 may have a wireless communication function, and may have a wired communication function.

The storage 16 is one or more storage areas that store various types of information. Each storage area may be a logical partition or a logical drive which is defined in a storage device (such as a hard disk, and a memory), for instance. The server 10 may include multiple storage devices (physical drives), and each individual physical drive may be defined as a separate storage area. Alternatively, these illustrated various storage areas may be combined and utilized. The storage 16 may not be provided in the server 10 itself, but may be provided in another device.

The storage 16 stores, for instance, association management information and cooperative function management information. The association management information is for managing the device 12 and association with the user who utilizes the device 12. The cooperative function management information is for managing cooperative functions which are achievable (feasible) by linking multiple devices 12. These pieces of information will be described in detail. Also, history information indicating the device 12 and functions utilized by users in the past may be generated, and the history information may be stored in the storage 16.

The controller 18 is configured to control the operation of each component of the server 10. The controller 18 includes an associating unit 20, a cooperative function identifier 22, and a display information generator 24.

The associating unit 20 is configured to associate the device 12 and a user who utilizes the device 12 with each other, and to register information indicating the association in association management information. For instance, device information on the device 12, and user information on the user who utilizes the device 12 are transmitted from the device 12 to the server 10. The device information includes, for instance, device identification information for identifying the device 12, and capability information indicating the capability owned by the device 12. The user information includes user identification information for identifying the user. The associating unit 20 associates, for instance, the device identification information and the user identification information with each other, and registers the device identification information and the user identification information in the association management information. Multiple devices 12 may be associated with the same user.

As an example, when user authentication to the device 12 is performed, and the authentication is successful, authentication information indicating that the authentication is successful, the device information, and the user information are transmitted from the device 12 to the server 10. In this case, the device 12 and user who has succeeded in authentication to the device 12 are associated with each other. When the same user succeeds in authentication to multiple devices 12, the authentication information, device information, and user information are transmitted from each of the devices 12 to the server 10, and the same user is associated with the multiple devices 12.

The cooperative function identifier 22 is configured to identify a cooperative function by referring to the cooperative function management information, the cooperative function being achievable by linking the multiple devices 12. The cooperative function identifier 22 identifies multiple devices 12 associated with the same user, for instance, in the association management information, and further identifies a cooperative function by referring to the cooperative function management information, the cooperative function being achievable by linking the multiple devices 12.

The display information generator 24 is configured to generate information to be displayed on device 12 (for instance, user interface information (hereinafter referred to as "UI information")). For instance, when a user is associated with one device 12, the display information generator 24 generates UI information for performing an operation such as an instruction for execution and setting of the function (singly performed function) owned by the device 12. The UI information is transmitted from the server 10 to the device 12, and is displayed on the device 12. The UI information for performing an operation such as an instruction for execution and setting of a singly performed function corresponds to an example of singly performed operation information.

When a user is associated with multiple devices 12, and a cooperative function achievable by linking the multiple devices 12 is identified by the cooperative function identifier 22, the display information generator 24 generates UI information for performing an operation such as an instruction for execution and setting of the cooperative function. The UI information is transmitted from the server 10 to each of the multiple devices 12, and is displayed on each device 12. The UI information for performing an operation such as an instruction for execution and setting of the cooperative function corresponds to an example of cooperative operation information.

Figures 3, 4, 5:
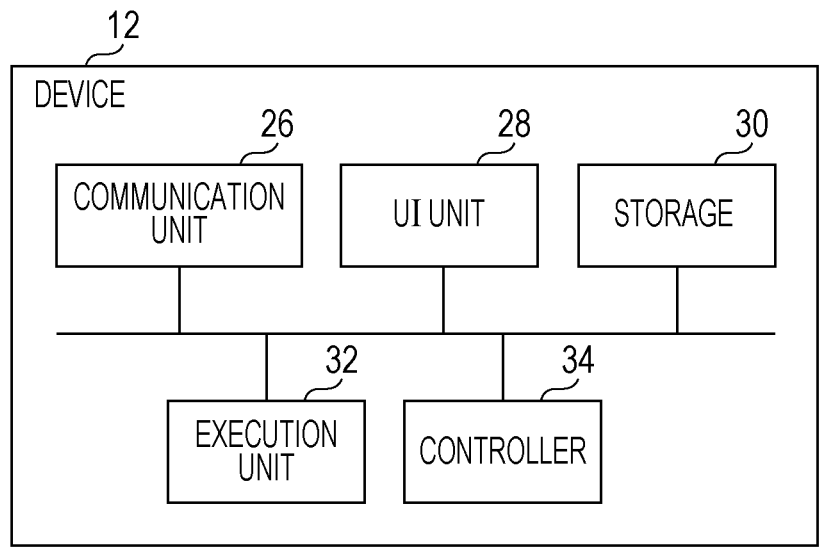
FIG. 3 is a block diagram illustrating the configuration of a device.
FIG. 4 is a table illustrating an association management table.
FIG. 5 is a table illustrating a cooperative function management table.

Hereinafter, the configuration of the device 12 will be described in detail with reference to FIG. 3. FIG. 3 illustrates an example of the configuration of the device 12. The configuration shared by each device 12 is illustrated in FIG. 3, and a configuration specific to individual device 12 is not illustrated.

A communication unit 26 is a communication interface, and is configured to transmit information to other devices, and to receive information from other devices. The communication unit 26 may have a wireless communication function, and may have a wired communication function.

A UI unit 28 is a user interface, and includes a display and a operation interface. The display is, for instance, a display device such as a liquid crystal display and an EL display. The operation interface is an input device such as a keyboard. The UI unit 28 may be a user interfaces (for instance, a touch panel) that includes a display and an operation interface. Also, the UI unit 28 may include a sound input unit such as a microphone for inputting sound, and a sound generator, such as a speaker, that generates sound.

The storage 30 is one or more storage areas that store various types of information. The storage 30 pre-stores device information on, for instance, the device 12 which is a self-device (that includes the storage 30).

An execution unit 32 is configured to execute the function of by the device 12. For instance, when the device 12 is a printer that has a print function, and instructions for execution of the print function are issued, the execution unit 32 executes printing in accordance with the instructions for execution. When a cooperative function is set, the execution unit 32 is configured to execute a function (function assigned to the device 12) to be executed by the device 12 among multiple functions included in the cooperative function.

The controller 34 is configured to control the operation of each component of the device 12. In addition, the controller 34 may perform authentication processing on a user of the self-device (the device 12). The self-device is permitted to be utilized by a user for whom authentication has succeeded, and the self-device is prohibited from being utilized by a user for whom authentication has failed. When authentication is successful, the controller 34 transmits to the server 10 device information on the self-device, and user information on a user for whom authentication has succeeded. It is to be noted that authentication processing may be performed by the server 13, or another device (for instance, an authentication server).

Hereinafter, the association management information will be described in detail with reference to FIG. 4. FIG. 4 illustrates an association management table. The data of an association management table is stored as the association management information in the storage 16.

In the association management table, as an example, user identification information for identifying each user (for instance, a user ID, and a name), device identification information (for instance, a device ID, a name, an IP address, and a MAC address) for identifying each device 12 for which authentication by a user has succeeded, and capability information indicating the capability of the device 12 are associated with each other. The user identification information is information included in the user information of the user. The device identification information and the capability information are information included in the device information on the device 12. The capability information includes, for instance, information indicating a singly performed function which may be executed by the device 12, information indicating the device configuration of the device 12, and information indicating the performance of the device 12. The singly performed function is a function achievable by the device 12 independently. For instance, printer A as a device 12 has a print function, and is capable of executing printing independently. The information indicating the device configuration of the printer A includes, for instance, information indicating the number of trays. The information indicating the performance of the printer A includes, for instance, information indicating color print capability and a print speed.

When a user is authenticated by the device 12 (for instance, when a user logs in the device 12), authentication information indicating that authentication has succeeded, device information on the device 12, and user information of the user are transmitted from the device 12 to the server 10. The associating unit 20 registers user identification information included in the user information, and the device identification information and capability information included in the device information in the association management table in association with each other.

For instance, user α is associated with the printer A and the PC(B) as the device 12. In other words, user α is authenticated by the printer A and the PC(B) (is logged in those devices 12). The same goes with another user β.

When authentication of the device 12 is cancelled, the associating unit 20 dissolves the association of a user with the device 12 for which authentication has been cancelled. The associating unit 20 may delete, for instance, the device information on the device 12 with authentication cancelled from the association management table, or may associate a flag with the device 12 in the association management table without deleting the device information, the flag indicating that authentication has been cancelled. The authentication may be cancelled, for instance, in accordance with instructions of a user, or when the device 12 has not been used for a predetermined time or longer, or due to other factors.

When a user is authenticated to the device 12 or when the authentication is cancelled, the associating unit 20 updates the association management table.

Hereinafter, the cooperative function management information will be described in detail with reference to FIG. 5.

FIG. 5 illustrates an example of the cooperative function Management table. The data of the cooperative functional management table is stored as the cooperative function management information in the storage 16. The cooperative function management table is generated in advance, for instance.

In the cooperative function management table, as an example, information indicating a combination of multiple devices 12 (or may be information indicating a combination of singly performed functions of devices 12), and information indicating cooperative functions achievable by linking the multiple devices 12 are associated with each other. For instance, a copy function is achievable as a cooperative function by linking printer A having a print function and PC(B) having an imaging function. Specifically, since printer A does not have an image reading function like a scanner, it is not possible to achieve a copy function or a scan function by itself. Also, PC(B) does not have a function of forming an image on a recording medium such as a sheet of paper. In contrast, printer A has a print function (a function of forming an image on a recording medium), and PC(B) has an imaging function (a function achieved by, for instance, a camera mounted on the PC(B)) as a function to read an image. It is possible to achieve a copy function by combining these functions. Specifically, an image is read by the camera mounted on the PC(B), and data of the image transferred from the PC(B) to the printer A, and the image is formed on a recording medium by the printer A. In this manner, it is possible to achieve a function by linking multiple devices 12, the function being not possible to be achieved singly by individual device 12.

Combinations of multiple devices 12, and cooperative functions achievable by linking the multiple devices 12 are predetermined, and the contents are pre-registered in the cooperative function management table. When a new device 12 is added to the information processing system, any cooperative function achievable by linking the new device 12 and the devices 12 registered already is registered in the cooperative functional management table, thus the cooperative functional management table is updated.

A cooperative function may be executed by linking three or more devices 12. Multiple devices 12 of different types may be linked, or multiple devices 12 of the same type may be linked. For instance, multiple devices 12 having different functions may be linked, or multiple devices 12 having the same function may be linked. A combination of the printer A and the PC(B) is an example of the former. A combination of multiple printers having the same function is an example of the latter. When multiple devices 12 have the same function are linked, the same function may be achieved by the Multiple devices 12. For instance, print processing may be distributed to multiple printers, and part of the print processing assigned to the self-device may be executed by each printer.

Figure 6:
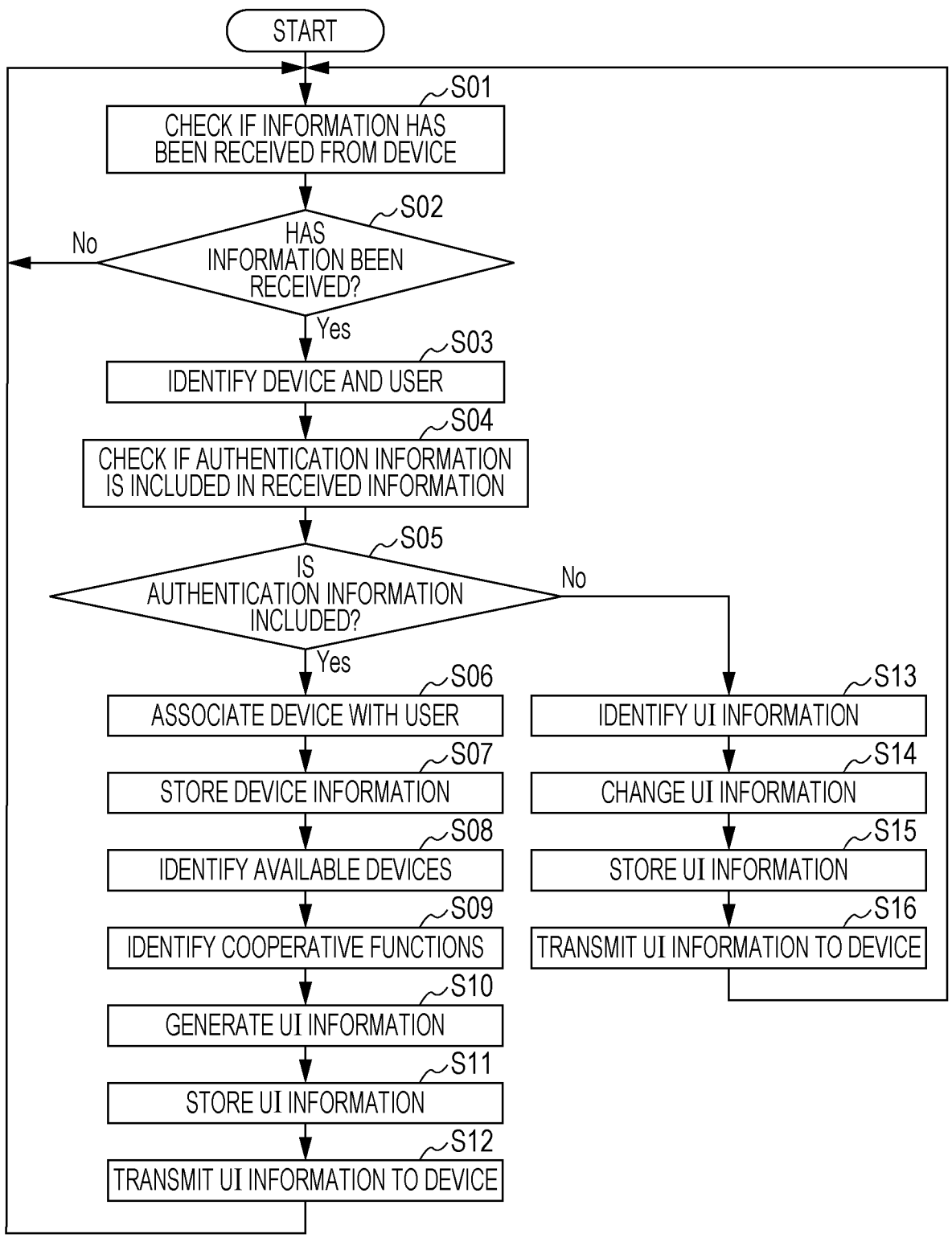
FIG. 6 is a flowchart illustrating the outline of processing.

Hereinafter, the scheme of processing performed by the information processing system according to the exemplary embodiment will be described with reference to FIG. 6. FIG. 6 is a flowchart illustrating the processing.

The controller 18 of the server 10 checks whether or not the server 10 has received information (information including the device information and the user information) from the device 12 (step S01).

When the server 10 has not received information from the device 12 (No in step S02), the processing returns to step S01.

When the server 10 has received information from the device 12 (Yes in step S02), the associating unit 20 identifies the device 12 that has transmitted the information to the server 10, based on the device information included in the received information, and identifies the user who operates the device 12, based on the user information included in the information (step S03).

Subsequently, the associating unit 20 checks whether or not authentication information is included in the information transmitted from the device 12 to the server 10 (step S04). Authentication processing to a user is performed by the device 12, and when authentication succeeds, authentication information indicating that authentication has succeeded is transmitted from the device 12 to the server 10.

When authentication information is included in the information (Yes in step S05), the associating unit 20 registers the identified device 12 and the identified user in the association management table in association with each other (step S06). The user is a user authenticated to the device 12 (a user who has logged in the device 12).

In addition, the associating unit 20 registers the device information (such as the capability information) included in the information in the association management table, and stores the device information in the storage 16 (step S07).

Subsequently, the cooperative function identifier 22 identifies all the devices 12 associated with the user in the association management table, and for each device 12, identifies the singly performed function (singly performed function which may be executed by the device 12) which may be provided by the device 12 (step S08).

In addition, the cooperative function identifier 22 identifies multiple devices 12 associated with the user in the association management table, and identifies each cooperative function associated with a combination of the multiple devices 12 in the association management table (step S09). In this manner, each cooperative function achievable by linking multiple devices 12 associated with the user is identified. When only one device 12 is associated with the user, no cooperative function is identified. Even when multiple devices 12 are associated with the user, if no cooperative function is achievable by linking the multiple devices 12 (for instance, when a cooperative function is not registered in the cooperative functional management table), no cooperative function is identified.

The display information generator 24 generates UI information for performing an operation such as an instruction for execution and setting of a singly performed function and a cooperative function identified as described above (step S10), and stores the UI information in the storage 16 in association with the user and the device 12 (step S11). When no cooperative function is identified, the UI information does not include information on the operation such as an instruction for execution and setting of a cooperative function.

The communication unit 14 transmits the UI information to the device 12 associated with the user under the control of the controller 18 (step S12). In the device 12 which has received the UI information, the controller 34 causes a display of the UI unit 28 to display the UI information. Thereafter, the processing returns to step S01.

On the other hand, when authentication information is not included in the information transmitted from the device 12 to the server 10 (No in step S05), the display information generator 24 identifies the UI information being displayed on the device 12 (step S13). For instance, when a user is already authenticated by the device 12 and has logged in the device 12, authentication information may not be included in the transmitted information. For instance, UI information is stored in the storage 16 in association with a user and a device 12, and the display information generator 24 refers to the association, thereby identifying the UI information associated with the identified user and the identified device 12.

Subsequently, the display information generator 24 changes the UI information based on the information transmitted from the device 12 to the server 10 (step S14). For instance, when information indicating occurrence of an error is included in the transmitted information, the display information generator 24 changes the UI information in response to the occurrence of the error.

The display information generator 24 stores the changed UI information in the storage 16 (step S15). For instance, the display information generator 24 stores the UI information in the storage 16 in association with the identified user and the identified device 12.

The communication unit 14 transmits the changed UI information to the device 12 which has transmitted the information to the server 10 under the control of the controller 18 (step S16). In the device 12 which has received the changed UI information, the controller 34 causes the display of the UI unit 28 to display the changed UI information. Thereafter, the processing returns to step S01.

Hereinafter, the processing performed by the information processing system according to the exemplary embodiment will be described in detail.

For instance, it is assumed that printer A is used as a device 12A, and PC(B) (for instance, a tablet PC) is used as a device 12B.

Figure 7:
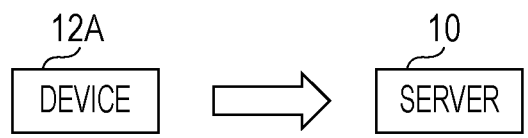
FIG. 7 is a diagram for explaining the details the processing.

First, as illustrated in FIG. 7, user α inputs user identification information (for instance, a user ID and a password) of user α to the device 12A, thereby requesting authentication (for instance, login) to the device 12A. The user α may attempt authentication using an ID card on which the user identification information is recorded. When authentication to the device 12A succeeds, login of the user α to the device 12A is completed, and the device 12A is permitted to be used by the user α. When authentication fails, the device 12A is prohibited from being used by the user α.

When authentication succeeds, the device 12A transmits user information (information including the user identification information) on the user α, and device information (information including the device identification information and the capability information) on the device 12A to the server 10. The capability information includes, for instance, the singly performed function (for instance, the print function) owned by the printer A, and information indicating the presence of a color print function.

The associating unit 20 identifies the device 12A (printer A) based on the device information transmitted from the device 12A, and identifies the user α who has logged in the device 12A based on the user information. The associating unit 20 then registers the device 12A and the user α in the association management table in association with each other. For instance, as illustrated in FIG. 4, the user α, the printer A, and the capability of the printer A are associated with each other.

In addition, the associating unit 20 stores the device information transmitted from the device 12A in the storage 16.

The cooperative function identifier 22 identifies that the function achievable by the device 12A (the function which may be provided by the device 12A) is a print function based on the capability information included in the device information.

The display information generator 24 generates UI information on allowing an operation such as an instruction for execution and setting of the print function to be performed, and an operation of only setting for other functions to be performed.

The communication unit 14 transmits the UI information to the device 12A under the control of the controller 18.

The controller 34 of the device 12A causes the display of the UI unit 28 to display the UI information.

Figure 8:
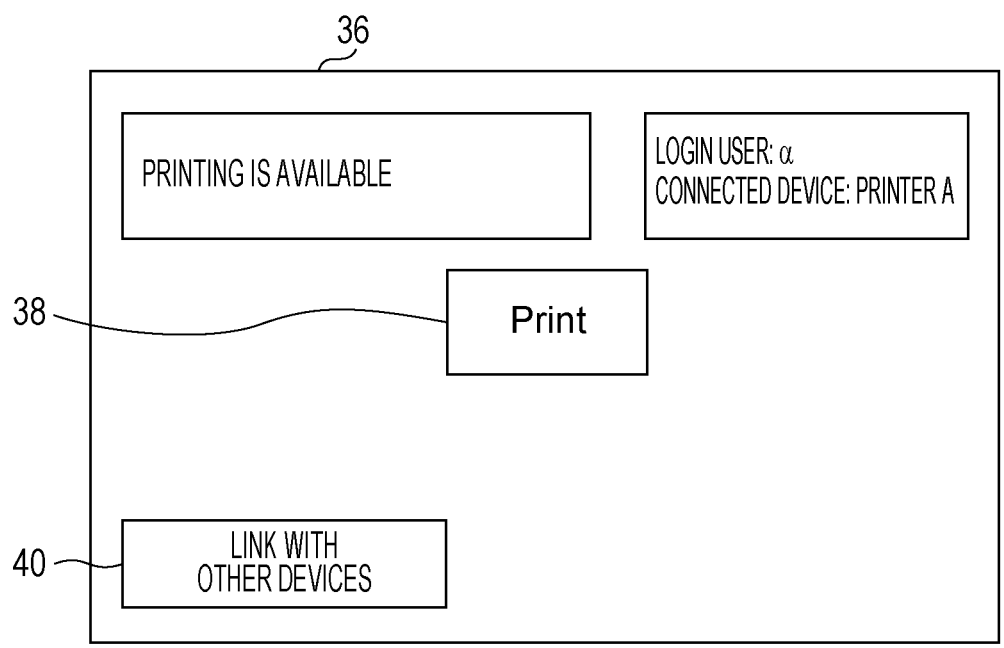
FIG. 8 is a view illustrating a screen.

Here, the UI information will be described with reference to FIG. 8. FIG. 8 is a view illustrating a screen. A screen 36 is displayed on the display of the UI unit 28 as the UI information. On the screen 36, information (for instance, a user ID and a name) for identifying the user α who has logged in the device 12A, and information (for instance, a device name) for identifying the device 12A. (printer A) are displayed. In addition, on the screen 36, information (for instance, a character string "printing is available") indicating that the function achievable by the device 12A is the print function, and a button image 38 in relation to the print function are displayed. When the button image 38 is pressed (for instance, is clicked) on the screen 36, the setting screen for the print function is displayed on the display of the UI unit 28. The user α is able to set the print function on the setting screen, and issue instructions for execution of printing.

In addition, on the screen 36, a button image 40 for displaying a cooperative function achievable by linking with the other devices) 12 is displayed. When the user α presses the button image 40 on the screen 36, information on the cooperative function may be displayed on the display of the UI unit 28.

Figure 9:
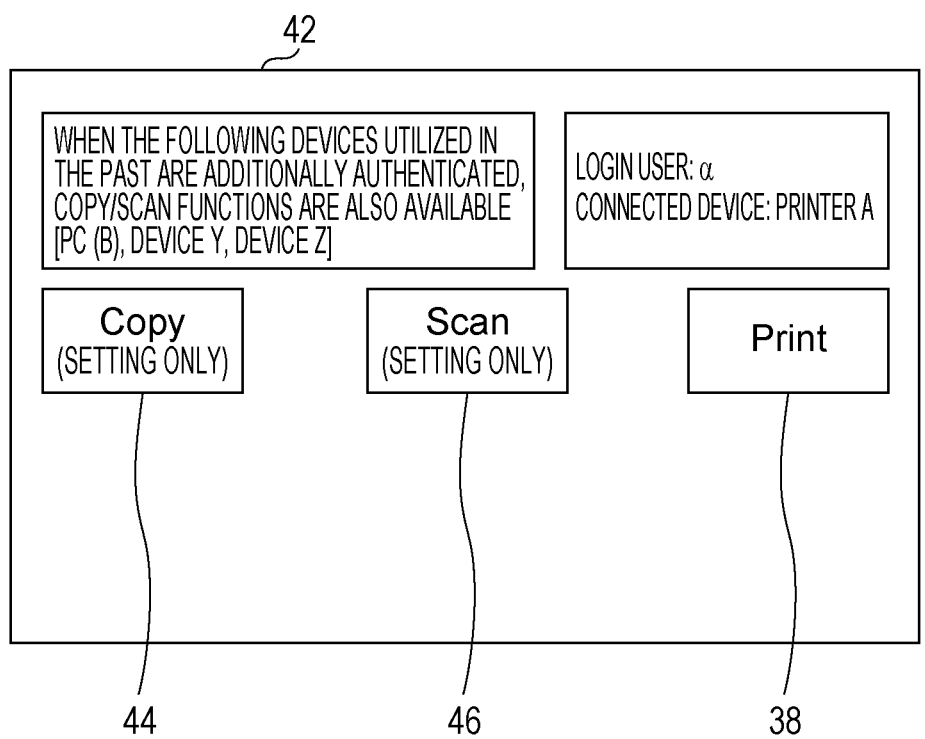
FIG. 9 is a view illustrating a screen.

FIG. 9 illustrates an example of display of information on the cooperative function. When the button image 40 is pressed by a user on the screen 36, the screen displayed on the display of the UI unit 28 makes transition from the screen 36 to a screen 42.

The information to be displayed on the screen 42 generated by the display information generator 24 of the server 10. For instance, the display information generator 24 refers to the cooperative functional management table, thereby identifying the other device(s) 12 with which a cooperative function is achievable by establishing cooperation an authenticated device 12A (printer A), and further identifying the cooperative function. For instance, PC(B) corresponds to the device 12 with which a cooperative function is achievable by linking the printer A, and a copy function is achievable as a cooperative function by linking the printer A and the PC(B) with a camera. In addition, an imaging function is achievable as a scan function by using the camera of the PC(B). In this case, the display information generator 24 generates UI information on allowing an operation such as an instruction for execution and setting of the print function of by the printer A to be performed, an operation of only setting for the scan function of by the PC(B) to be performed, and an operation of only setting for the copy function as the cooperative function to be performed. The display information generator 24 causes device identification information for identifying the PC(B) to be included, in the UI information. The UI information is transmitted from the server 10 to the device 12A, and is displayed as the screen 42 on the device 12A.

As another example, for each user, the controller 18 may manage history information that indicates each device 12 utilized by the user, and may store the history information of each user in the storage 16. In this case, the display information generator 24 identifies each device 12 utilized by the user α in the past by referring to the history information of the user α, and identifies each cooperative function achievable by linking the device 12 and the printer A by referring to the cooperative functional management table. The display information generator 24 generates UI information on allowing an operation such as an instruction for execution and setting of the print function of by the printer A to be performed, and an operation of only setting for the identified cooperative function to be performed. The display information generator 24 causes the device identification information for identifying each device 12 utilized in the past to be included in the UI information. The UI information is transmitted from the server 10 to the device 12A, and is displayed as the screen 42 on the device 12A.

The screen 42 illustrated in FIG. 9 is an example of UI information generated based on the above-mentioned history information. For instance, the PC(B) as the device 12B, and a device 12Y and a device 12Z were utilized by the user α in the past. Also, the copy function as a cooperative function is achievable by linking the device 12B and the device 12Y or the device 12Z and the device 12A (printer A), and the scan function is achievable by using the device 12B and the device 12Y or the device 12Z. Thus, when the user α is authenticated to the device 12B and the device 12Y or the device 12Z, information indicating that it is possible to additionally utilize the copy function and the scan function is displayed on the screen 42. In this manner, other devices 12 (not authenticated devices 12) for achieving a cooperative function are guided to the user.

Also, a button image 44 in relation to the copy function, and a button image 46 in relation to the scan function are displayed on the screen 42 along with the button image 38 in relation to the print function. In the stage where the user α is not authenticated to each device 12 for achieving the copy function and the scan function, an operation of only setting for the copy function and the scan function is possible. For instance, when the button image 44 is pressed by the user α, a setting screen for setting the copy function is displayed on the display of the UI unit 28. Although the user α may make settings for the copy function on the setting screen, it is not possible for the user α to issue instructions for execution of the copy function. The same goes with the button image 46 in relation to the scan function. Since the printer A is already authenticated, the user α is able to set the print function and issue instructions for execution of printing by pressing the button image 38 in relation to the print function.

The devices 12 (for instance, the devices 12B, 12Y, 12Z) are identified, with which a cooperative function is achievable by linking the authenticated device 12A, and information indicating the devices 12 is displayed on the device 12A, thereby providing to the user information on the devices 12 with which a cooperative function is achievable by linking the device 12A.

Also, information indicating the cooperative function is displayed on the device 12A, thereby providing to the user the information on the cooperative function achievable by linking the device 12 and the other device(s) 12.

Figure 10:
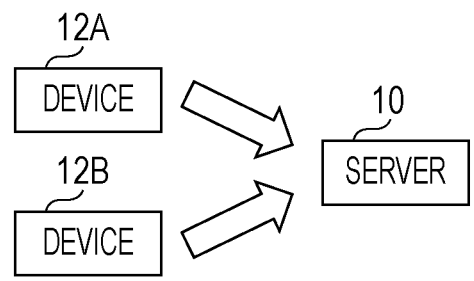
FIG. 10 is a diagram for explaining the details of the processing.

Hereinafter, it is assumed that the user α continues to request authentication to the device 12B (PC(B)). As illustrated in FIG. 10, the user α requests authentication (for instance, login) to the device 12B by inputting the user identification information (for instance, a user ID and a password) on the user α to the device 12B. The user α may attempt authentication using an ID card on which the user identification information is recorded. When authentication to the device 12B succeeds, login of the user α to the device 12B is completed, and the device 12B is permitted to be used by the user α. When authentication fails, the device 12B is prohibited from being used by the user α.

When authentication succeeds, the device 12B transmits user information (information including the user identification information) on the user α, and device information (information including the device identification information and the capability information) on the device 12B to the server 10. The capability information includes, for instance, the singly performed function (for instance, an imaging function) owned by the PC(B).

The associating unit 20 identifies the device 12B (PC(B)) based on the device information transmitted from the device 12B, and identifies the user α who has logged in the device 12B based on the user information. The associating unit 20 then registers the device 12B and the user α in the association management table in association with each other. The printer A and the user α are already associated with each other, and as a consequence, as illustrated in FIG. 4, the user α, the printer A, and the capability of the printer A are associated with each other, and the user α, PC(B), and the capability of PC(B) are further associated with each other. In this manner, the user α, and authenticated printer A and PC(B) are associated with each other.

In addition, the associating unit 20 stores the device information transmitted from the device 12B in the storage 16.

The cooperative function identifier 22 identifies that the function achievable by the device 12B (the function which may be provided by the device 12B) is an imaging function based on the capability information included in the device information. An image may be read by the imaging function, thus the imaging function corresponds to the scan function using a camera.

The cooperative function identifier 22 identifies the cooperative function associated with a combination of the printer A and the PC(B) in the cooperative function management table. In the example illustrated in FIG. 5, the copy function is registered as the cooperative function, and is identified as the cooperative function achievable by linking the printer A and the PC(B).

The display information generator 24 generates UI information on allowing an operation such as an instruction for execution and setting of the print function (the singly performed function of the printer A), the scan function (the singly performed function of the PC(B)), and the copy function (cooperative function) to be performed.

The communication unit 14 transmits the UI information to the devices 12A, 12B under the control of the controller 18.

The controller 34 of each of the devices 12A, 12B causes the display of the UI unit 28 to display the UI information.

Figure 11:
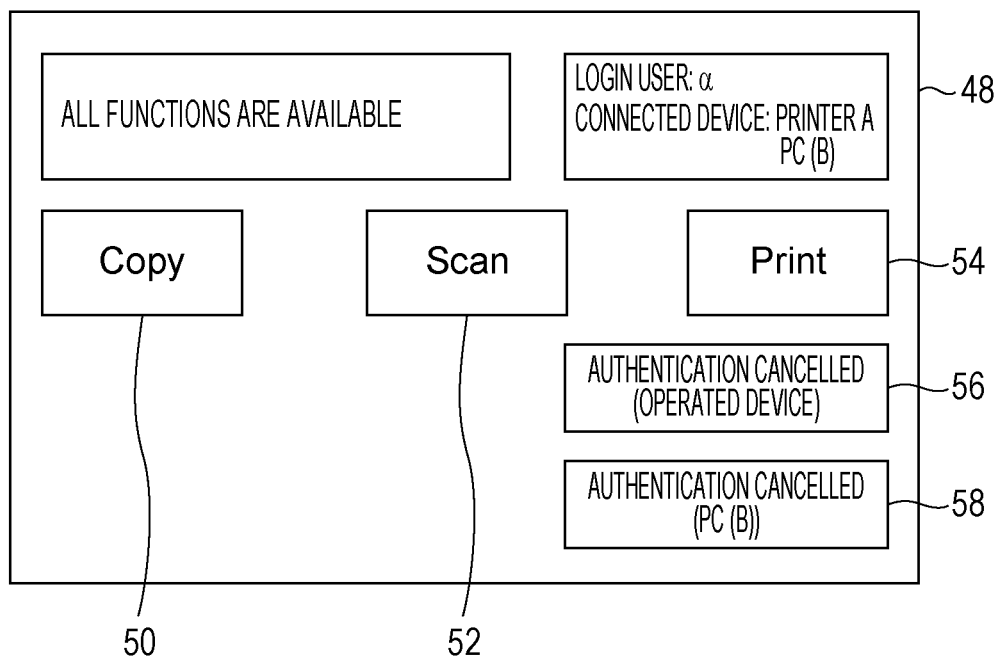
FIG. 11 is a view illustrating a screen.
Figure 12:
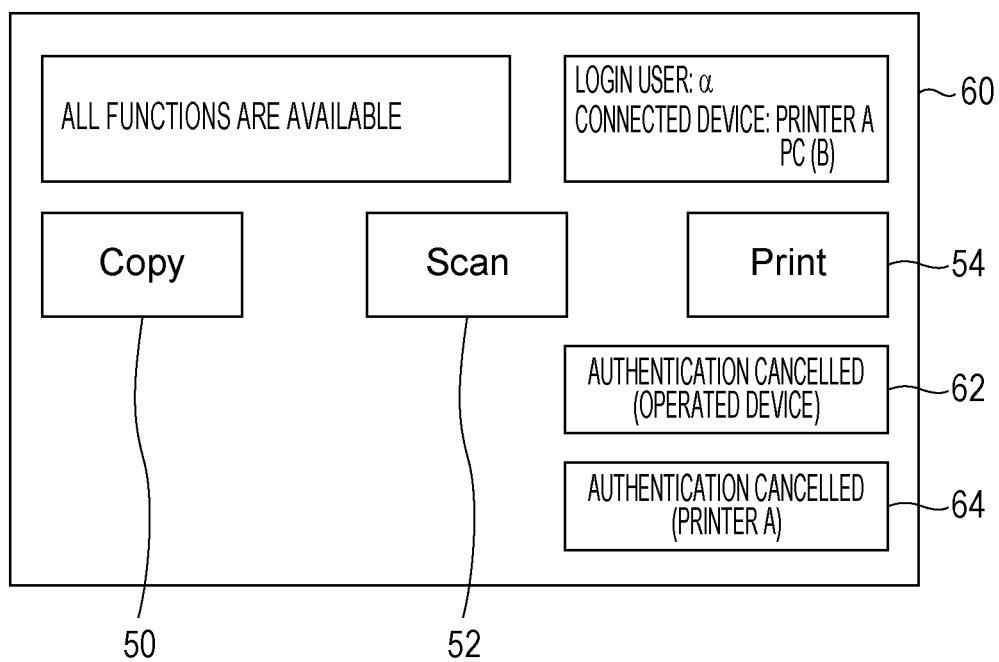
FIG. 12 is a view illustrating a screen.

Here, the UI information will be described with reference to FIGS. 11 and 12. FIGS. 11 and 12 illustrate an example of a screen. FIG. 11 illustrates an example of a screen displayed on the device 12A (printer A). FIG. 12 illustrates an example of a screen displayed on the device 12B (PC(B)).

A screen 48 illustrated in FIG. 11 is displayed as the UI information on the display of the UI unit 28 of the device 12A. On the screen 48, information (for instance, a user ID and a name) for identifying the user α who has logged in the device 12A, information (for instance, a device name) for identifying the device 12A (printer A), and information for identifying the device 12B (PC(B)) are displayed. Also, on the screen 48, a button image 50 in relation to the copy function, a button image 52 in relation to the scan function of by the PC(B), and a button image 54 in relation to the print function of by the printer A are displayed. When the button image 50 is pressed (for instance, is clicked) on the screen 48, the setting screen for the copy function is displayed on the display of the UI unit 28. The user α is able to set the copy function on the setting screen, and issue instructions for execution of copying. Similarly, when the button image 52 is pressed, the user α is able to set the scan function, and issue instructions for execution of scanning, and when the button image 54 is pressed, the user α is able to set the print function, and issue instructions for execution of printing.

Also, on the screen 48, a button image 56 for cancelling authentication to the device 12A (printer A) is displayed. When the button image 56 is pressed, the controller 34 of the device 12A cancels the authentication to the user α. Thus, the user α is logged out from the device 12A. In this case, the controller 34 of the device 12A causes the screen to make transition from the screen 48 to the screen for authentication.

Also, on the screen 48, a button image 58 for cancelling authentication to the device 12B (PC(B)) as a cooperative partner is displayed. When the button image 58 is pressed, the device 12A transmits information to the server 10, the information indicating that authentication to the device 12B has been cancelled. Cancellation of authentication to the device 12B indicates that linking between the devices 12A, 12B is cancelled, thus the display information generator 24 generates UI information in which only the device 12A is authenticated. The UI information provides the information of the screen 36 illustrated in FIG. 8, and the information of the screen 42 illustrated in FIG. 9. The UI information is transmitted from the server 10 to the device 12A, and is displayed on the display of the UI unit 28 of the device 12A. Since only the device 12A is authenticated, the screen 36 is displayed on the display, and the screen 42 is displayed on the display in accordance with instructions of the user α.

A screen 60 illustrated in FIG. 12 is displayed as the UI information on the display of the UI unit 28 of the device 12B. On the screen 60, information (for instance, a user ID and a name) for identifying the user α who has logged in the device 12B, information (for instance, a device name) for identifying the device 12A (printer A), and information for identifying the device 12B (PC(B)) are displayed. Similarly to the screen 48, the button image 50, the button image 52, and the button image 54 are displayed on the screen 60.

Also, on the screen 60, a button image 62 for cancelling authentication to the device 12B (PC(B)) is displayed. When the button image 62 is pressed, the controller 34 of the device 12B cancels the authentication to the user α. Thus, the user α is logged out from the device 12B. In this case, the controller 34 of the device 12B causes the screen to make transition from the screen 60 to the screen for authentication.

Also, on the screen 60, a button image 64 for cancelling authentication to the device 12A (printer A) as a cooperative partner is displayed. When the button image 64 is pressed, the device 12B transmits information to the server 10, the information indicating that authentication to the device 12A has been cancelled. Cancellation of authentication to the device 12A indicates that linking between the devices 12A, 12B is cancelled, thus the display information generator 24 generates UI information in which only the device 12B is authenticated. For instance, regarding the scan function, the UI information is information on allowing execution and settings to be performed, and regarding other functions, the UI information is information on allowing only settings to be performed.

When the button image 56 for cancelling authentication to the device 12A is pressed on the screen 48 of the device 12A, the device 12A transmits information to the server 10, the information indicating that the authentication to the device 12A has been cancelled. Also in this case, the linking between the devices 12A, 12B is cancelled, thus as the UI information for the device 12B, the display information generator 24 generates UI information in which only the device 12B is authenticated. The UI information is transmitted from the server 10 to the device 12B, and is displayed on the device 12B.

Similarly, when the button image 62 for cancelling the authentication to the device 12B is pressed on the screen 60 of the device 12B, the device 12B transmits information to the server 10, the information indicating that the authentication to the device 12B has been cancelled. Also in this case, the linking between the devices 12A, 12B is cancelled, thus as the UI information for the device 12A, the display information generator 24 generates UI information in which only the device 12A is authenticated. The UI information is transmitted from the server 10 to the device 12A, and is displayed on the device 12A.

As described above, when the same user α is associated with multiple devices 12 (for instance, the printer A and PC(B)), UI information for executing each cooperative function achievable by linking the multiple devices 12 is displayed on each of the multiple devices 12. For instance, when the same user α is authenticated to each of the multiple devices 12, UI information for executing each cooperative function is displayed on the devices 12. In this manner, information is provided for operating each cooperative function achievable by linking multiple devices 12 predicted to be utilized by the same user α. The UI information is displayed on the device 12 used for a cooperative function, thus a display device other than the device 12 does not need to be used.

Even if a user does not press the button image for authentication cancellation, when the device 12 is not operated by the user during the period since the start of authentication until a predetermined time elapses, the controller 34 of the device 12 may cancel the authentication. For instance, the controller 34 of the device 12 which is not operated by the user cancels the authentication. In other words, only the authentication to the device 12 which is not operated is cancelled.

As another example, authentication to all the devices 12 by which the user is authenticated may be cancelled. For instance, when a user is authenticated to the printer A and the PC(B), in a situation where the printer A is operated by the user, and PC(B) is not operated by the user, the authentication to not only the PC(B) but also the printer A may be cancelled. Information indicating cancellation instructions is transmitted from the PC(B) not operated to the printer A via the server 10, for instance.

When execution of a cooperative function is completed, a screen for confirming whether or not the authentication to the devices 12 other than the self-device is cancelled may be displayed on the display of the UI unit 28 of the self-device. For instance, when the copy function as a cooperative function is executed by the printer A and the PC(B), and the execution is completed, the controller 34 of the printer A causes the display of the UI unit 28 of the printer A to display a confirmation screen for confirming whether or not the authentication to the PC(B) is cancelled. Similarly, the controller 34 of the PC(B) causes the display of the UI unit 28 of the PC(B) to display a confirmation screen for confirming whether or not the authentication to the printer A is cancelled. When instructions to cancel the authentication to the PC(B) are given by a user on the confirmation screen displayed on the printer A, information indicating cancellation instructions are transmitted from the printer A to the PC(B) via the server 10. When receiving the information indicating cancellation instructions, the controller 34 of the PC(B) cancels the authentication to the self-device. The same goes with the printer A.

When the authentication to the device 12 is cancelled, the associating unit 20 of the server 10 cancels the association between the user authenticated to the device 12 and the device 12.

Modifications

Hereinafter, a first modification will be described with reference to FIGS. 13 and 14. In the first modification, the printer A is used as the device 12A, and the PC(B) having no imaging function (specifically, the PC(B) with no camera) is used as the device 12B.

Figure 13:
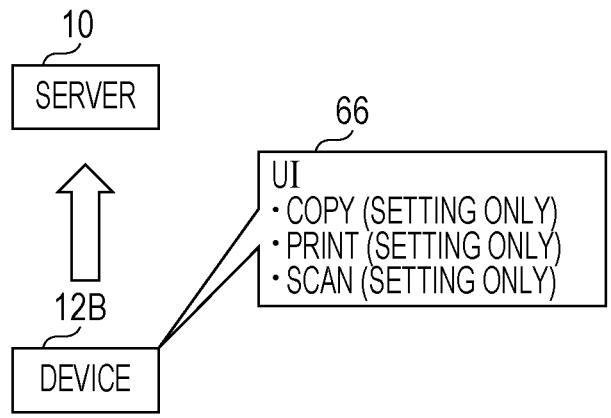
FIG. 13 is a diagram for explaining processing according to a first modification.

For instance as illustrated in FIG. 13, when a user is authenticated only to the device 12B (PC(B)), UI information 66 on allowing only various functions to be set is displayed on the display of the UI unit 28 of the device 12B. The UI information 66 is information on allowing only setting for, for instance, a cooperative function predicted to be achievable by linking with the other device(s) 12 (for instance, the device 12A), and a singly performed function predicted to be owned by the other device(s) 12.

Figure 14:
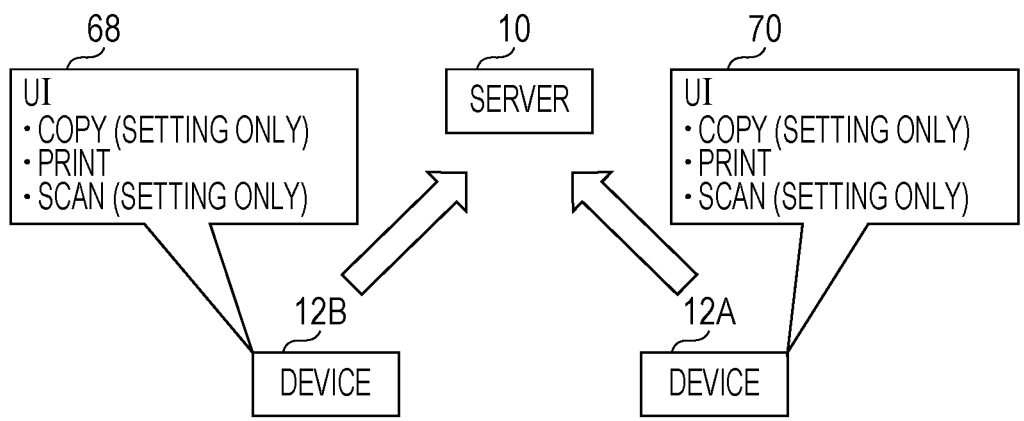
FIG. 14 is a diagram for explaining the processing according to the first modification.

As illustrated in FIG. 14, when a user is authenticated to the device 12B followed by the device 12A (printer A), UI information 68 is displayed on the display of the UI unit 28 of the device 12B, and UI information 70 is displayed on the display of the UI unit 28 of the device 12A. The UI information 68, 70 provide information on allowing an operation such as an instruction for execution and setting of the singly performed function of the device 12A to be performed, and allowing only setting for a cooperative function predicted to be achievable by further linking with the other device(s) 12. Since the print function is achievable by the device 12A, a button image for performing an operation such as an instruction for execution and setting of the print function is displayed in the UI information 68, 70. In contrast, the copy function and the scan function are not achievable by the devices 12A, 12B, thus only settings may be performed for those functions.

Hereinafter, a second modification will be described with reference to FIG. 15. In the second modification, multiple devices 12 having the same function are associated with the user, and the same function is executed by the multiple devices 12.

Figure 15:
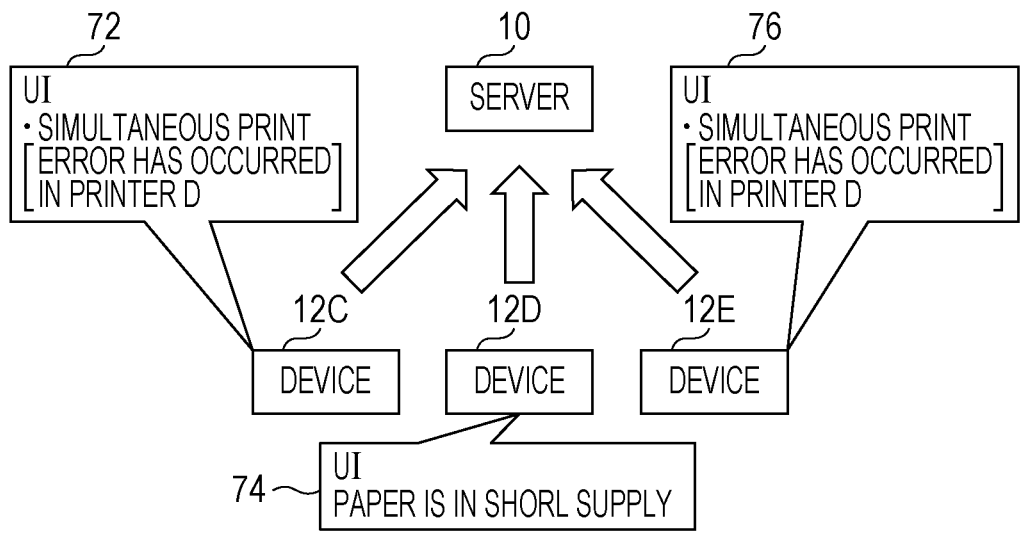
FIG. 15 is a diagram for explaining processing according to a second modification.

In the example illustrated in FIG. 15, the user α is authenticated to devices 12C, 12D, and 12E, and the user α and the devices 12C, 12D, and 12E are associated with each other. The devices 12C, 12D, 12E are printers each having the print function.

For instance, it is assumed that the user α operates the device 12C to issue to the devices 12C, 12D, and 12E execution instructions for simultaneous printing function to make multiple copies. The designated number of copies is nine, as an example. In this case, information indicating instructions for printing nine copies is transmitted from the device 12C to the server 10, and the server 10 further transmits information indicating instructions for printing three copies to each of the devices 12C, 12D, and 12E. Each of the devices 12C, 12D, and 12E executes printing for the number of copies (three copies) assigned to itself. In other words, printing is performed by the devices 12C, 12D, and 12E in a distributed manner.

It is assumed that the device 12D runs out of paper while printing is performed. In this case, the device 12D transmits error information to the server 10, the error information indicating the running-out of paper.

The display information generator 24 generates UI information to be displayed on each of the devices 12C, 12D, and 12E, based on the error information.

For instance, the display information generator 24 generates information (for instance, an error message) indicating that paper in short supply, as UI information for the device 12D in which the error has occurred. The information is transmitted from the server 10 to the device 12D, and is displayed on the display of the UI unit 28 of the device 12D.

The display information generator 24 generates information (for instance, an error message) indicating that an error has occurred in the device 12D, as UI information for the devices 12C, 12E in which no error has occurred. The information is transmitted from the server 10 to each of the devices 12C, 12E, and is displayed on the display of the UI unit 28 of each of the devices 12C, 12E.

As illustrated in FIG. 15, UI information 72 displayed on the display of the device 12C includes information indicating that an error has occurred in the device 12D (printer D). UI information 74 displayed on the display of the device 12D in which an error has occurred includes information indicating that paper is in short supply. Information indicating that an error has occurred in the device 12D is displayed in UI information 76 displayed on the display of the device 12E.

In this manner, when processing is executed by multiple devices 12 in a distributed manner, and an error occurs in one or more devices 12 included in the multiple devices 12, information corresponding to the error is displayed on each of the devices 12.

Hereinafter, another modification will be further described. When a user is authenticated to multiple devices 12 having the same function, the server 10 may transmit UI information as described below to each device 12.

For instance, when authentication is additionally performed on the other device(s) 12 having the same function as that of the device 12 associated with a user authenticated already, the display information generator 24 may generate information on a confirmation screen for confirming whether or not the authentication to the device 12 authenticated already is cancelled. The information on the confirmation screen is transmitted from the server 10 to the other device(s) 12, and is displayed on the other device(s) 12. When a user issues cancelling instructions on the confirmation screen, information indicating the instructions is transmitted from the other device(s) 12 to the device 12 to be cancelled via the server 10, and the authentication to the device 12 to be cancelled is cancelled. In this manner, the multiple devices 12 having the same function is prevented from being associated with a user at the same time.

When multiple devices 12 (for instance, printers) having the same function (for instance, the print function) is associated with a user, the display information generator 24 may generate information on a screen for making an inquiry to the user about the devices 12 which execute the function. The information on the screen is transmitted from the server 10 to a device 12 operated by the user to issue execution instructions for the function, and is displayed on the device 12. When the user designates a device 12 on the screen, which executes the function, information indicating the execution instructions for the function is transmitted to the device 12 which executes the function. In this manner, the function is executed by the device 12.

In the exemplary embodiment and modifications described above, the controller 18 of the server 10 identifies multiple devices 12 connected to the same network as the devices 12 to be linked, and does not have to identify multiple devices 12 connected to different networks as the devices 12 to be linked. For instance, multiple devices 12 installed on the same floor or the same building and connected to the same network are identified as the devices 12 to be linked, and multiple devices 12 installed on different floors or different buildings and connected to different networks are not identified as the devices 12 to be linked. In this manner, cooperative functions achievable by using multiple devices 12 connected to the same network are provided to users.

When a user is authenticated to the devices 12, information for making an inquiry to the user as to whether or not information on cooperative function is displayed may be display on the display of the UI unit 28 of the device 12.

As an example, each of the server 10 and the devices 12 is implemented by cooperation between hardware and software. Specifically, each of the server 10 and the devices 12 includes one or more processors such as a CPU which is not illustrated. The function of each component of the server 10 and the devices 12 is implemented by the one or more processors reading and executing a corresponding program stored in a storage device which is not illustrated. The program is stored in the storage device via a recording medium such as a CD or a DVD or through a communication path such as a network. As another example, each component of the server 10 and the devices 12 may be implemented by hardware resources such as a processor, an electronic circuit, and an application specific integrated circuit (ASIC). A device such as a memory may be utilized for the implementation. As still another example, each component of the server 10 and the devices 12 may be implemented by a digital signal processor (DSP) or a field programmable gate array (FPGA).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor programmed to:
cause a display provided in each of a first device and a second device to display cooperative operation information for operating a cooperative function achievable by linking the first device and the second device;
when a same user is associated with the first device and the second device, cause the display to display the cooperative operation information;
when the user is associated with only one device of the first device and the second device, cause the display provided in the one device to display singly performed operation information for operating the one device; and when the user is associated with the first device and the second device, cause the display provided in each of the first device and the second device to display the cooperative operation information.

2. The information processing device according to claim 1, wherein when the user is associated with the one device only, the processor is further programmed to:

cause the display provided in the one device to display information indicating the cooperative function achievable by linking the one device and the other device.

3. The information processing device according to claim 2, wherein the processor is further programmed to:

cause the display provided in the one device to display information on the other device by which the cooperative function is achievable along with the one device.

4. The information processing device according to claim 1, wherein the processor is further programmed to:

receive first device information on the first device associated with the user from the first device, and receive second device information on the second device associated with the user from the second device; and when the first device information and the second device information are received by the processor, transmit to the first device and the second device the cooperative operation information for operating the cooperative function achievable by linking the first device and the second device, and cause the display provided in each of the first device and the second device to display the cooperative operation information.

5. An information processing device comprising:

a display; and a processor programmed to:

cause the display to display cooperative operation information for operating a cooperative function achievable by linking the information processing device and another device;

authenticates a user;

when the user authenticated by the processor is authenticated by the other device, cause the display to display the cooperative operation information; and when the user is authenticated by the processor, and the user is not authenticated by the other device, cause the display to display information indicating the cooperative function achievable by linking the information processing device and the other device.

6. An information processing system comprising:

a first device that has a first function;

a second device that has a second function; and a management device that manages the first device and the second device, wherein when a user is authenticated to the first device, the first device transmits first information including information on the first device and information on the user to the management device, and the management device manages the user authenticated by the first device and the first device in association with each other, when a user is authenticated to the second device, the second device transmits second information including information on the second device and the information indicating the user to the management device, and the management device manages the user authenticated by the second device and the second device in association with each other, when the user authenticated by the first device and the first device are managed in association with each other by the management device, and the user is authenticated by the second device and the second information is transmitted to the management device, the management device transmits, to the first device and the second device, cooperative operation information for operating a cooperative function achievable by linking the first device and the second device, and the first device and the second device each display the cooperative operation information.

\* \* \* \* \*